United States Patent [19]
Liu

[11] Patent Number: 5,800,700
[45] Date of Patent: Sep. 1, 1998

[54] SLUDGE SUPERNATANT DECANTING DEVICE

[76] Inventor: John Keh-Jong Liu, 14 Highland Dr., Parlin, N.J. 08859

[21] Appl. No.: 791,657

[22] Filed: Jan. 30, 1997

[51] Int. Cl.⁶ .......................... B01D 17/12; F16K 21/18
[52] U.S. Cl. .......................... 210/109; 210/123; 137/398
[58] Field of Search .................... 210/109, 121, 210/123, 242.1, 519; 137/395–398

[56] References Cited

U.S. PATENT DOCUMENTS

| | | | |
|---|---|---|---|
| 783,878 | 2/1905 | Lydon | 210/123 |
| 2,427,102 | 9/1947 | Hale | 210/121 |
| 2,455,338 | 11/1948 | Lind | 210/109 |

*Primary Examiner*—Joseph W. Drodge

[57] ABSTRACT

A sludge supernatant decanting device for automatically decanting the supernatant from a sludge holding tank. The sludge supernatant decanting device includes a decant column connected to and in fluid communication with a supernatant discharge conduit and disposed within a sludge holding tank having a plurality of spaced-apart apertures. The spaced-apart apertures are opened and sealingly closed by a plurality of float switches hingedly attached to the decant column by sealed ball bearing hinges.

17 Claims, 4 Drawing Sheets

SLUDGE SUPERNATANT DECANTING DEVICE

BACKGROUND OF THE INVENTION

1. Field of the Invention

The present invention relates to waste treatment systems and more particularly pertains to a new Sludge Supernatant Decanting Device for automatically decanting the supernatant from a sludge holding tank.

2. Description of the Prior Art

The use of waste treatment systems is known in the prior art. More specifically, waste treatment systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art waste treatment systems include U.S. Pat. No. 4,259,182; U.S. Pat. No. 4,927,530; U.S. Pat. No. 3,951,788; and U.S. Pat. No. 4,2 71,026.

While these devices fulfill their respective, particular objectives and requirements, the aforementioned patents do not disclose a new Sludge Supernatant Decanting Device. The inventive device includes a decant column having a plurality of spaced apart apertures and being disposed within the sludge holding tank, the decant column further being connectable to and in fluid communication with a sludge holding tank discharge conduit and a means for opening and sealingly closing the spaced-apart apertures responsive to changes in the fluid level of the sludge holding tank.

In these respects, the Sludge Supernatant Decanting Device according to the present invention substantially departs from the conventional concepts and designs of the prior art, and in so doing provides an apparatus primarily developed for the purpose of automatically decanting the supernatant from a sludge holding tank.

SUMMARY OF THE INVENTION

In view of the foregoing disadvantages inherent in the known types of waste treatment systems now present in the prior art, the present invention provides a new Sludge Supernatant Decanting Device construction wherein the same can be utilized for automatically decanting the supernatant from a sludge holding tank.

The general purpose of the present invention, which will be described subsequently in greater detail, is to provide a new Sludge Supernatant Decanting Device and method which has many of the advantages of the waste treatment systems mentioned heretofore and many novel features that result in a new Sludge Supernatant Decanting Device which is not anticipated, rendered obvious, suggested, or even implied by any of the prior art waste treatment systems, either alone or in any combination thereof.

To attain this, the present invention generally comprises a decant column having a plurality of spaced apart apertures and being disposed within the sludge holding tank, the decant column further being connectable to and in fluid communication with a sludge holding tank discharge conduit and a means for opening and sealingly closing the spaced-apart apertures responsive to changes in the fluid level of the sludge holding tank.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Sludge Supernatant Decanting Device and method which has many of the advantages of the waste treatment systems mentioned heretofore and many novel features that result in a new Sludge Supernatant Decanting Device which is not anticipated, rendered obvious, suggested, or even implied by any of the prior art waste treatment systems, either alone or in any combination thereof.

It is another object of the present invention to provide a new Sludge Supernatant Decanting Device which may be easily and efficiently manufactured and marketed.

It is a further object of the present invention to provide a new Sludge Supernatant Decanting Device which is of a durable and reliable construction.

An even further object of the present invention is to provide a new Sludge Supernatant Decanting Device which is susceptible of a low cost of manufacture with regard to both materials and labor, and which accordingly is then susceptible of low prices of sale to the consuming public, thereby making such Sludge Supernatant Decanting Device economically available to the buying public.

Still yet another object of the present invention is to provide a new Sludge Supernatant Decanting Device which provides in the apparatuses and methods of the prior art some of the advantages thereof, while simultaneously overcoming some of the disadvantages normally associated therewith.

Still another object of the present invention is to provide a new Sludge Supernatant Decanting Device for automatically decanting the supernatant from a sludge holding tank.

Yet another object of the present invention is to provide a new Sludge Supernatant Decanting Device which includes a decant column having a plurality of spaced apart apertures and being disposed within the sludge holding tank, the decant column further being connectable to and in fluid communication with a sludge holding tank discharge conduit and a means for opening and sealingly closing the spaced-apart apertures responsive to changes in the fluid level of the sludge holding tank.

Still yet another object of the present invention is to provide a new Sludge Supernatant Decanting Device that eliminates the need for chemical coagulant use in the decanting process.

Even still another object of the present invention is to provide a new Sludge Supernatant Decanting Device that always decants the top layer of the sludge holding tank.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
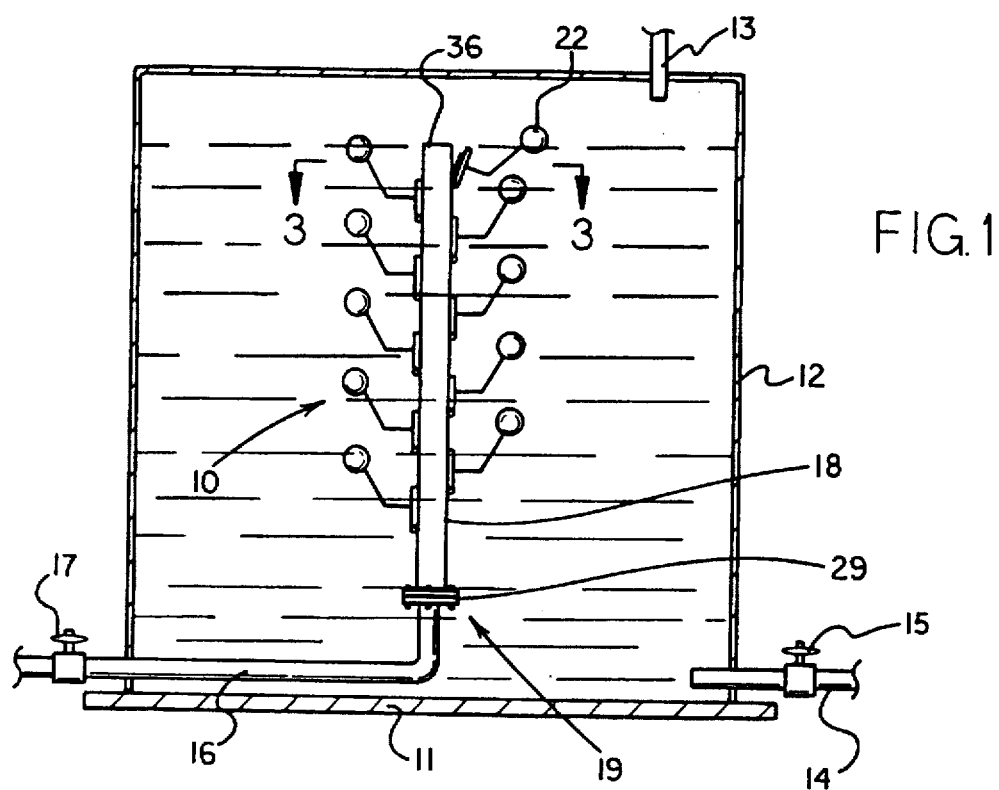
FIG. 1 is a side elevation view of a new Sludge Supernatant Decanting Device according to the present invention.

With reference now to the drawings, and in particular to FIGS. 1 through 8 thereof, a new Sludge Supernatant Decanting Device embodying the principles and concepts of the present invention and generally designated by the reference numeral 10 will be described.

More specifically, it will be noted that the Sludge Supernatant Decanting Device 10 comprises a decant column 18 having a plurality of spaced-apart apertures 21. The decant column 18 is disposed within a sludge holding tank 12 and is connectable and in fluid communication with a sludge holding tank discharge conduit 16 by means of a coupling means 19. A plurality of float switches 20 open and sealingly close the spaced-apart apertures in response to changes in the fluid level of the sludge holding tank 12.

With reference to FIG. 1 the Sludge Supernatant Decanting Device 10 of the present invention is shown disposed within a sludge holding tank 12 having a base 11. The Sludge Supernatant Decanting Device 10 may be positioned anywhere within the sludge holding tank 12 and is shown positioned in the middle of the sludge holding tank 12 for illustrative purposes only. Additionally, while only one Sludge Supernatant Decanting Device 10 is shown disposed within the sludge holding tank 12, it is understood that, depending upon the size of the sludge holding tank, several such devices could be disposed within the sludge holding tank.

With continued reference to FIG. 1 the decant column 18 is shown coupled to the supernatant discharge conduit 16 by means of a coupling means 19. The coupling means 19 include flanges 29 shown bolted together. A supernatant discharge control valve 17 controls the operation of the float switches 20 (FIG. 4) by changing the fluid level of the sludge holding tank 12. The uppermost float switch is always held partially open when the fluid level in the tank is level with an open top end of the decant column 36 by means of the relative position of the float 22.

With continued reference to FIG. 1 an influent conduit 13 is shown for adding sludge to the sludge holding tank 12 from a sedimentation basin, filter backwash, primary settling basin and secondary settling basin. Also shown is a sludge discharge conduit 14 together with a sludge discharge control valve 15. Following separation of the supernatant from the sludge, the sludge discharge control valve 15 is opened to allow for the removal of the thickened sludge.

Figure 2:
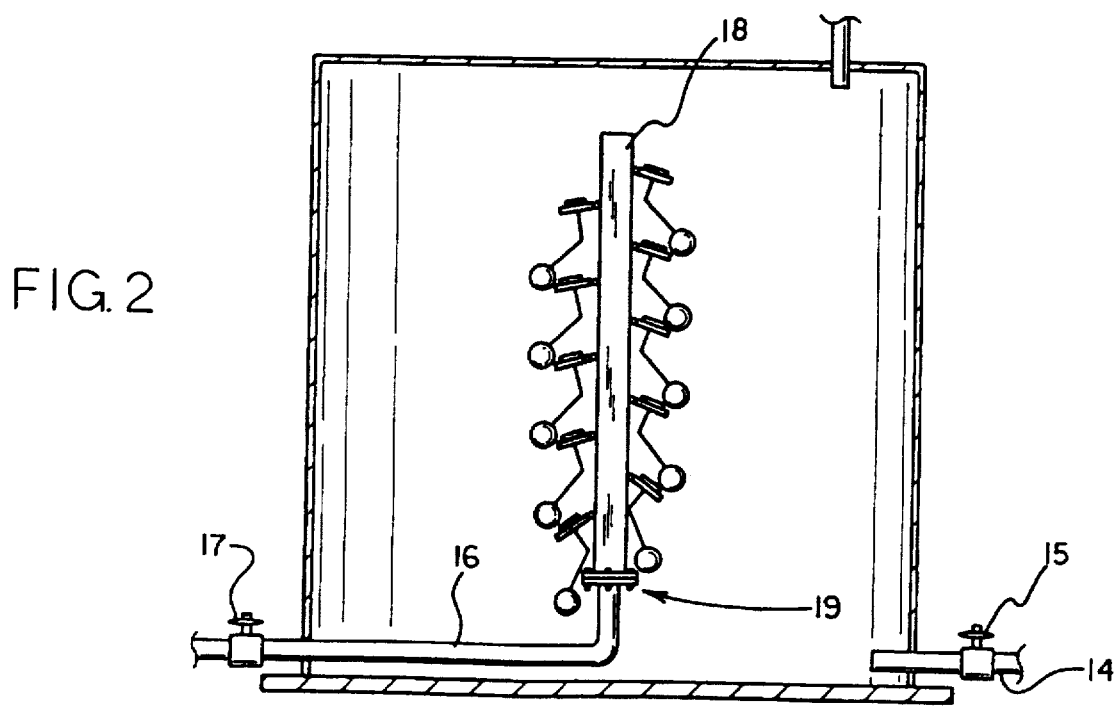
FIG. 2 is a side elevation view thereof showing the new Sludge Supernatant Decanting Device in an empty sludge holding tank.

With reference to FIG. 2 the Sludge Supernatant Decanting Device 10 is shown disposed in an empty sludge holding tank 12.

Figure 3:
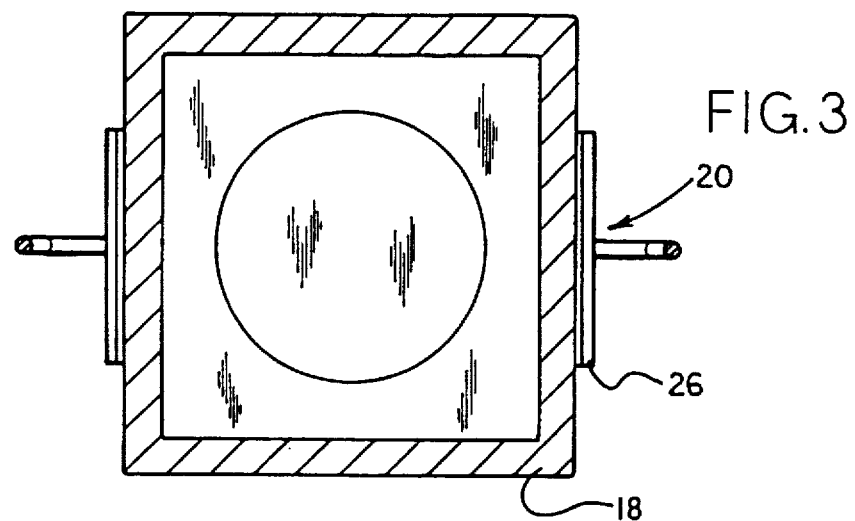
FIG. 3 is top plan view of the present invention.

With reference to FIG. 3 a decant column 18 having a square cross section is shown. It is understood that the decant column 18 can have other cross sectional shapes and still operate in the manner intended.

Figure 4:
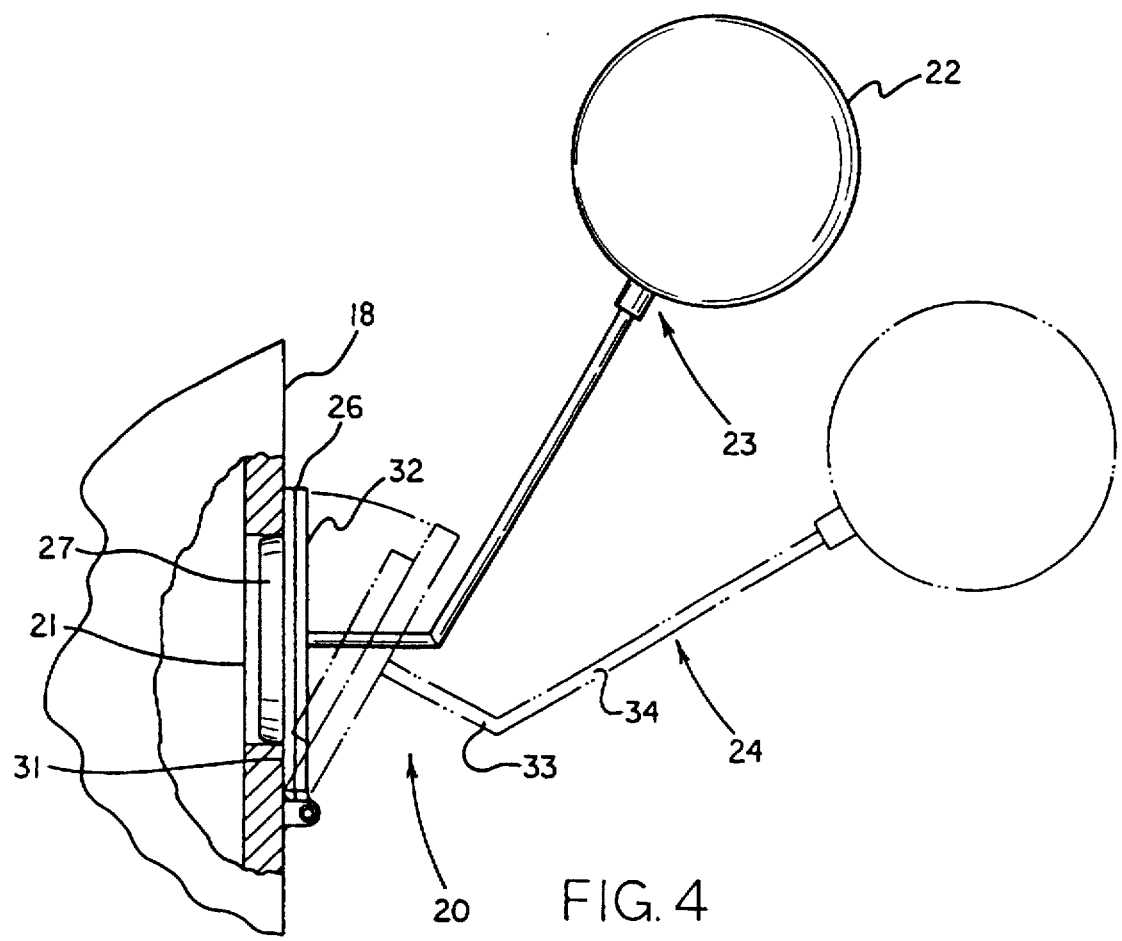
FIG. 4 is a fragmented view of the invention showing the float switch assembly.

With reference to FIG. 4 the float switch assembly 20 is shown including a valve 26 having a gasket 27 mounted on a rear surface 31. The gasket sealingly closes the aperture 21 when the rear surface 31 of the valve 26 is seated against the decant column 18. The valve 26 is opened and closed by means of a rod 24 attached to a float 22. The rod 24 has a first section 33 integrally formed on the valve 26 which extends orthogonally from a front surface 32 of the valve 26. A second section 34 terminates in the float 22 and extends from the first section 33 at an obtuse angle. In the preferred embodiment the second section 34 is axially aligned with the decant column 18.

Figure 5:
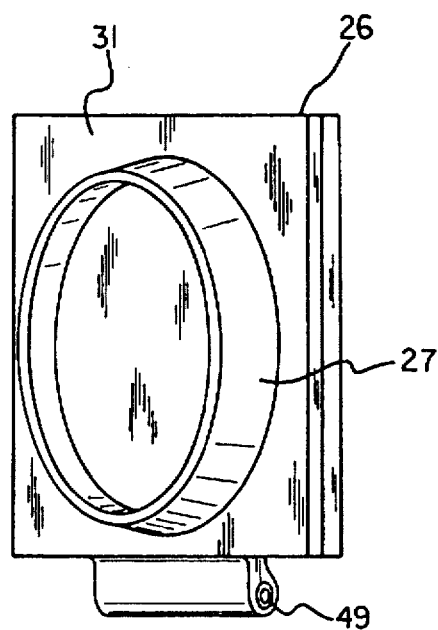
FIG. 5 is a perspective view of the valve.

With reference to FIG. 5 the rear surface of the valve 26 is shown including the gasket 27. The gasket 27 is shown contoured inwardly to sealingly close an aperture 21 having a circular shape. It is understood that other shapes are possible for the aperture 21.

Figure 6:
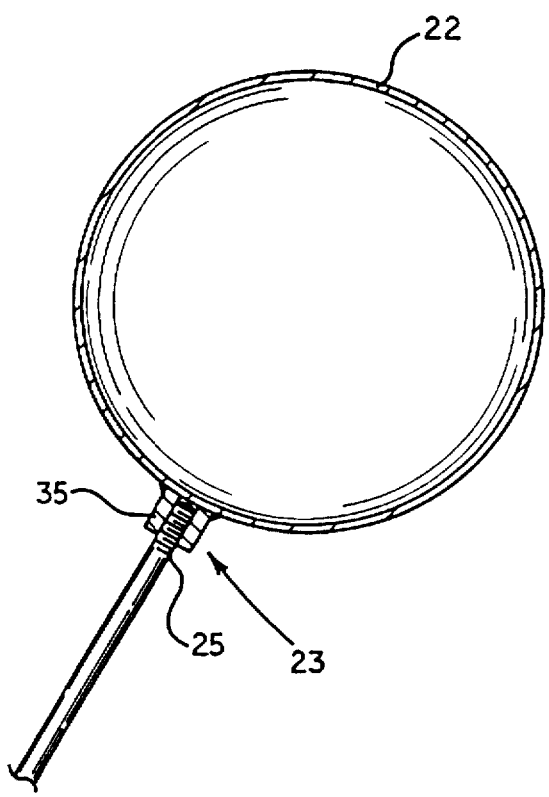
FIG. 6 is a fragmented view of the float and rod assembly.

With reference to FIG. 6 the float 22 is shown including a threaded nut 35 integrally formed thereon. A threaded end 25 of the second section 34 threadingly attaches to the threaded nut 35.

Figure 7:
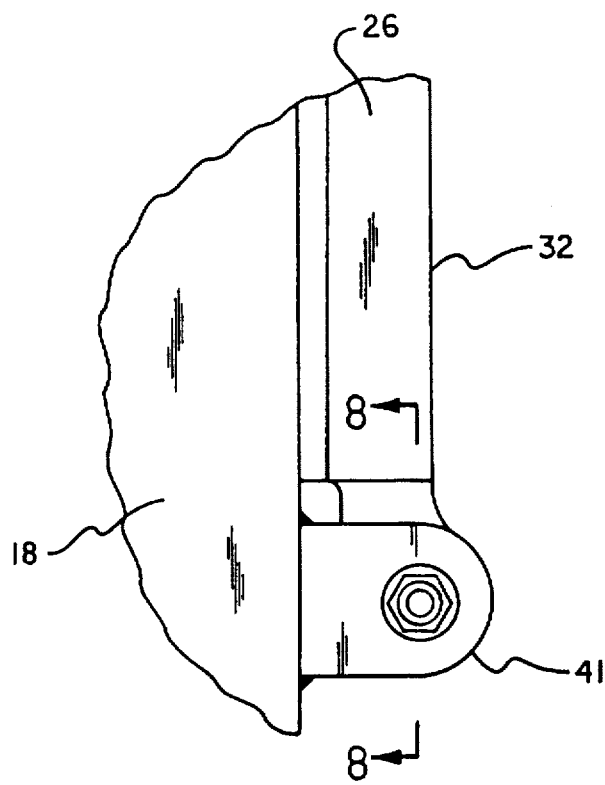
FIG. 7 is a fragmented view of the float switch assembly showing the mounting bracket.

With reference to FIG. 7 the valve 26 is shown mounted to the decant column 18. A mounting bracket 41 is shown fixedly attached to the decant column 18 such that the gasket 27 is aligned with the aperture 21.

Figure 8:
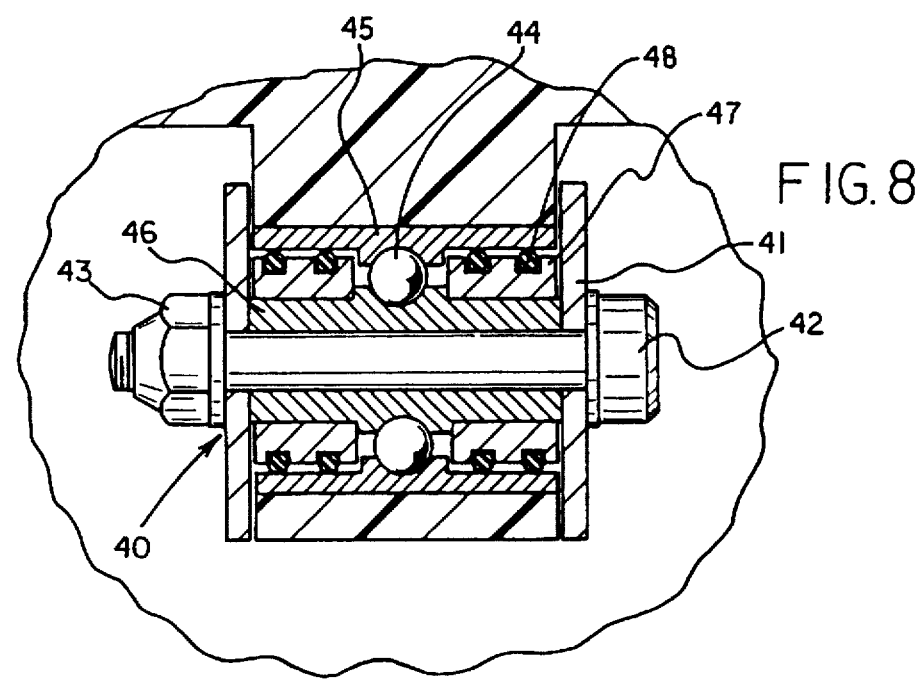
FIG. 8 is a cross sectional view taken along line 8—8 of FIG. 7.

With reference to FIG. 8 the ball bearing hinge 40 is shown including an outer race 45 press fit into a bore 49 (FIG. 5) formed in the valve 26. An inner race 46 is slip fit on a cap screw 42 which is secured to the mounting brackets 41 by means of a self locking nut 43. The inner race includes a pair of O-ring mounting blocks 47 press fit on either side of the bearings 44. A pair of O-rings 48 are shown disposed in recesses formed in the O-ring mounting blocks 47 for slidingly and sealingly contacting the outer race 45. The O-rings 48 prevent the entry of fluid into the hinge. Most preferably, the hinge 40 has a pair of rings of ball bearings 44 to reduce the possibility of rocking by the valve 26 with respect to the decant column 18. In warmer temperature conditions, the ball bearing hinge 40 may be omitted and a regular hinge used.

The decant column 18 can be constructed of stainless steel, plastic, fiberglass or any other suitable material. The float 22 can be constructed of plastic, rubber or any other suitable material. The rod 24 and valve 26 can be constructed of stainless steel, plastic or any other suitable material.

In use, the sludge holding tan k 12 is filled with sludge from the sedimentation basin, filter backwash, primary settling basin and secondary settling basin for thickening through the influent conduit 13. The supernatant discharge control valve 17 is opened and draws any supernatant present above the level of the decant column open top end 36. Simultaneously the uppermost float switch opens allowing for flow of supernatant into the decant column 18 and out the supernatant discharge conduit 16. Float switches located along the extent of the decant column 18 open successively and allow for flow of supernatant into the decant column 18 and out the supernatant discharge conduit 16. Thickened sludge remaining in the sludge holding tank is discharged by opening the sludge discharge control valve 15, the thickened sludge exiting the sludge holding tank through the sludge discharge conduit 14 disposed proximate the bottom of the sludge holding tank 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A sludge supernatant decanting device for decanting a supernatant from a sludge holding tank, said sludge supernatant decanting device comprising:
   a decant column being disposable in a sludge holding tank, said decant column having an outer perimeter surface and a plurality of spaced-apart apertures in said outer perimeter surface, the decant column further being connectable to a sludge holding tank supernatant discharge conduit for fluid communication with said conduit;
   a plurality of float switches for opening and sealingly closing the spaced-apart apertures, said float switches being responsive to changes in the fluid level of the sludge holding tank;
   wherein each float switch comprises a valve comprising a valve plate having a front and rear surface, a gasket fixedly attached to said rear surface, the gasket being sealingly receivable in the aperture, the valve further comprising a rod extending from a front surface, the rod terminating in a float; and
   a means for hingedly attaching a lowermost portion of said valve plate to the decant column such that the rear surface of said valve plate is positioned substantially flush with the outer perimeter surface of said decant column when said valve plate is in a closed position for reducing any sludge interference with the movement of said valve plate.

2. The sludge supernatant decanting device of claim 1, wherein the means for hingedly attaching the valve to the decant column further comprise a ball bearing hinge having a pair of spaced-apart "O" rings disposed on either side thereof.

3. The sludge supernatant decanting device of claim 2, wherein the ball bearing hinge further comprises an outer race, the outer race being press fit into a bore formed in the valve, and an inner race, the inner race being slip fit by means of a cap screw and self-locking nut between a pair of mounting brackets fixedly attached to the decant column.

4. The sludge supernatant decanting device of claim 3, wherein each pair of spaced-apart "O" rings is disposed on an "O" ring mounting block, the "O" ring mounting block being press fit onto the inner race such that the spaced-apart "O" rings slidably and sealingly contact the outer race.

5. The sludge supernatant decanting device of claim 1, wherein the rod further comprises a first section extending orthogonally from the front surface and terminating in a second section extending at an obtuse angle therefrom.

6. The sludge supernatant decanting device of claim 5, wherein the first section has a length of between four and six inches and the second section has a length of twelve inches.

7. The sludge supernatant decanting device of claim 1, wherein the decant column is cylindrical.

8. The sludge supernatant decanting device of claim 1, wherein the decant column is rectangular.

9. The sludge supernatant decanting device of claim 1, wherein the decant column is triangular.

10. The sludge supernatant decanting device of claim 1, wherein said decant column has a cross-sectional area and the rear surface of said valve plate has an area, and wherein the area of the rear surface is substantially equal to the cross-sectional area of said decant column such that sludge in said sludge holding tank helps hold said valve plate into the closed position.

11. A sludge supernatant decanting device for decanting a supernatant from a sludge holding tank, said sludge supernatant decanting device comprising:
   a decant column having a plurality of spaced-apart apertures and being disposed within the sludge holding tank, the decant column further being connectable to and in fluid communication with a sludge holding tank supernatant discharge conduit;
   a means for opening and sealingly closing the spaced-apart apertures responsive to changes in the fluid level of the sludge holding tank;
   wherein the means for opening and sealingly closing the spaced-apart apertures includes a plurality of float switches;
   wherein each float switch further comprises a valve having a gasket fixedly attached to a rear surface, the gasket being sealingly receivable in the aperture, the valve including a rod extending from a front surface, the rod terminating in a float, and a means for hingedly attaching the valve to the decant column;
   wherein the means for hingedly attaching the valve to the decant column includes a ball bearing hinge having a pair of spaced-apart "O" rings disposed on either side thereof; and wherein the ball bearing hinge further comprises an outer race, the outer race being press fit into a bore formed in the valve, and an inner race, the inner race being slip fit by means of a cap screw and self-locking nut between a pair of mounting brackets fixedly attached to the decant column.

12. The sludge supernatant decanting device of claim 11, wherein the rod further comprises a first section extending orthogonally from the front surface and terminating in a second section extending at an obtuse angle therefrom.

13. The sludge supernatant decanting device of claim 12, wherein the first section has a length of between four and six inches and the second section has a length of twelve inches.

14. The sludge supernatant decanting device of claim 11, wherein each pair of spaced-apart "O" rings is disposed on an "O" ring mounting block, the "O" ring mounting block being press fit onto the inner race such that the spaced-apart "O" rings slidably and sealingly contact the outer race.

15. The sludge supernatant decanting device of claim 11, wherein the decant column is cylindrical.

16. The sludge supernatant decanting device of claim 11, wherein the decant column is rectangular.

17. The sludge supernatant decanting device of claim 11, wherein the decant column is triangular.

* * * * *